(12) United States Patent
Grassel et al.

(10) Patent No.: US 12,522,038 B2
(45) Date of Patent: Jan. 13, 2026

(54) METHODS AND APPARATUS TO FACILITATE A TIRE CHANGE

(71) Applicant: Ford Global Technologies, LLC, Dearborn, MI (US)

(72) Inventors: Elaine Grassel, Brighton, MI (US); Anthony Paul Magagnoli, Dexter, MI (US); Jonathan Michael Tucco, Livonia, MI (US); Dakota Drake Legge, South Lyon, MI (US); Emmanuel Gonzalez, Toluca (MX); Taylor Remington, Canton, MI (US); David Michael Russell, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 18/632,269

(22) Filed: Apr. 10, 2024

(65) Prior Publication Data

US 2025/0319733 A1    Oct. 16, 2025

(51) Int. Cl.
*B60G 17/015* (2006.01)
*B60G 17/017* (2006.01)
*B60S 5/00* (2006.01)

(52) U.S. Cl.
CPC ....... *B60G 17/0155* (2013.01); *B60G 17/017* (2013.01); *B60G 2400/52* (2013.01); *B60G 2400/952* (2013.01); *B60G 2500/32* (2013.01); *B60S 5/00* (2013.01)

(58) Field of Classification Search
CPC .......... B60G 17/005; B60G 17/0155; B60G 17/017; B60G 2400/52; B60G 2400/952; B60G 2500/32; B60S 5/00
See application file for complete search history.

(56) References Cited

U.S. PATENT DOCUMENTS

| | | | | |
|---|---|---|---|---|
| 3,826,322 A | * | 7/1974 | Williams | B60S 9/215 180/209 |
| 5,100,167 A | * | 3/1992 | Kamimura | B60G 17/017 280/5.503 |
| 5,286,059 A | * | 2/1994 | Tabe | B60G 17/017 280/5.514 |
| 5,452,919 A | * | 9/1995 | Hoyle | B60G 17/0523 280/5.514 |

(Continued)

FOREIGN PATENT DOCUMENTS

| | | |
|---|---|---|
| CA | 2699322 C | 8/2015 |
| CN | 1221687 A * | 7/1999 |

(Continued)

*Primary Examiner* — John M Zaleskas
(74) *Attorney, Agent, or Firm* — Lorne Forsythe; Hanley, Flight and Zimmerman, LLC (57) ABSTRACT

Methods and apparatus to facilitate a tire change are disclosed. An example apparatus includes interface circuitry, machine readable instructions, and programmable circuitry to at least one of instantiate or execute the machine readable instructions to detect an underinflated tire of a vehicle, cause an air suspension system to increase a ground clearance height of the vehicle to a first height in response to detecting the underinflated tire, cause the air suspension system to prevent air movement after the ground clearance height is increased to the first height.

20 Claims, 4 Drawing Sheets

(56) References Cited

U.S. PATENT DOCUMENTS

| | | | | |
|---|---|---|---|---|
| 5,652,703 | A | * | 7/1997 | Kawazoe ............. B60G 17/017 280/5.514 |
| 5,801,306 | A | * | 9/1998 | Chamussy ......... B60C 23/0408 73/146.5 |
| 5,968,294 | A | * | 10/1999 | Willard, Jr. ......... B60C 15/0607 152/550 |
| 6,183,010 | B1 | * | 2/2001 | Daoud .................... B60C 23/08 280/766.1 |
| 6,293,562 | B1 | * | 9/2001 | Kutscher ............. B60G 17/016 280/5.514 |
| 9,597,940 | B2 | | 3/2017 | Anderson et al. |
| 2003/0234066 | A1 | * | 12/2003 | Grotendorst ............ B60C 23/04 152/416 |
| 2005/0004732 | A1 | * | 1/2005 | Berry .................... B60W 10/10 701/1 |
| 2005/0248107 | A1 | * | 11/2005 | Roos .................. B60G 17/0185 280/43.23 |
| 2006/0219503 | A1 | | 10/2006 | Kim |
| 2007/0191996 | A1 | * | 8/2007 | Bondu ................ B60C 23/0408 701/1 |
| 2007/0265749 | A1 | * | 11/2007 | Fitzgibbons .......... B60W 50/00 701/37 |
| 2008/0021610 | A1 | * | 1/2008 | Oshiro .................. B60C 23/061 701/37 |
| 2008/0077293 | A1 | * | 3/2008 | Fitzgibbons ....... B60G 17/0185 280/5.514 |
| 2008/0243336 | A1 | * | 10/2008 | Fitzgibbons ......... B60G 17/016 701/82 |
| 2009/0079146 | A1 | * | 3/2009 | Stahl ................ B60G 17/01933 701/45 |
| 2009/0173149 | A1 | * | 7/2009 | Bork .................... B60C 23/061 73/146 |
| 2012/0046827 | A1 | * | 2/2012 | Larkins ................ B60G 17/018 701/37 |
| 2014/0288776 | A1 | * | 9/2014 | Anderson ................ F16F 9/064 701/37 |
| 2014/0350787 | A1 | * | 11/2014 | Swanson ............. B60G 17/019 701/37 |
| 2015/0105977 | A1 | * | 4/2015 | Lee .................... B60G 17/0185 701/37 |
| 2016/0031287 | A1 | * | 2/2016 | Guest .................. B60G 17/016 701/37 |
| 2016/0121667 | A1 | * | 5/2016 | Benedict ............... H02J 7/0042 152/419 |
| 2017/0203626 | A1 | * | 7/2017 | Guest ................. B60G 17/0165 |
| 2018/0264905 | A1 | | 9/2018 | Kimura |
| 2018/0312165 | A1 | * | 11/2018 | Dudar .................... G06V 20/56 |
| 2019/0234790 | A1 | * | 8/2019 | Sherlock ............ B60C 23/0474 |
| 2021/0245568 | A1 | * | 8/2021 | Kawata ................ B60G 17/005 |
| 2021/0379954 | A1 | * | 12/2021 | Bremmer ........... B60G 17/0165 |
| 2023/0043104 | A1 | * | 2/2023 | Abdallah ........... B60G 17/0525 |
| 2025/0256543 | A1 | * | 8/2025 | Gwidt ............. B60G 17/01908 |

FOREIGN PATENT DOCUMENTS

| | | | | |
|---|---|---|---|---|
| CN | 105059075 | A | * 11/2015 | |
| CN | 107953777 | A | * 4/2018 | ............ B60K 31/02 |
| CN | 108622272 | B | 1/2020 | |
| CN | 111824048 | A | * 10/2020 | ........ B60R 16/0233 |
| CN | 113844228 | A | * 12/2021 | ............ B60W 10/22 |
| CN | 116890591 | A | * 10/2023 | ........ B60G 17/0155 |
| CN | 117183640 | A | * 12/2023 | |
| CN | 117360149 | A | * 10/2024 | .......... B60G 21/055 |
| DE | 102004039992 | A1 | * 2/2006 | ............ B60C 17/06 |
| DE | 102004029055 | B4 | 7/2016 | |
| EP | 2366562 | A1 | * 9/2011 | ........ B60G 17/0155 |
| GB | 2495231 | A | 4/2013 | |
| JP | S61102303 | A | * 5/1986 | |
| JP | H0999723 | A | * 4/1997 | |
| JP | 2004358988 | A | * 12/2004 | |
| JP | 2019077315 | A | 5/2019 | |
| KR | 20080052875 | A | * 6/2008 | ................ B60S 9/20 |
| KR | 101068988 | B1 | 9/2011 | |
| WO | WO-2024198347 | A1 | * 10/2024 | ............ B60G 17/08 |
| WO | WO-2024257489 | A1 | * 12/2024 | ............ B60W 30/02 |
| WO | WO-2025044757 | A1 | * 3/2025 | ............ B60W 40/13 |

* cited by examiner

METHODS AND APPARATUS TO FACILITATE A TIRE CHANGE

FIELD OF THE DISCLOSURE

This disclosure relates generally to vehicles and, more particularly, to methods and apparatus to facilitate a tire change.

BACKGROUND

Changing an underinflated (e.g., flat) tire is a stressful and labor intensive task. For example, a person may be required to change an underinflated tire on a side of the highway with high-speed traffic.

SUMMARY

Example methods and apparatus to facilitate a tire change are disclosed. An example apparatus includes interface circuitry, machine readable instructions, and programmable circuitry to at least one of instantiate or execute the machine readable instructions to detect an underinflated tire of a vehicle, cause an air suspension system to increase a ground clearance height of the vehicle to a first height in response to detecting the underinflated tire, and cause the air suspension system to prevent air movement after the ground clearance height is increased to the first height.

An example vehicle includes a suspension system including an air compartment coupled to a body of the vehicle to control a height of the body, a tire, interface circuitry, machine readable instructions, and programmable circuitry to at least one of instantiate or execute the machine readable instructions to determine whether the tire is underinflated, cause air to be delivered to the air compartment to increase the height of the body to a first height after determining that the tire is underinflated, and prevent the air from moving into or out of the air compartment after the height of the body is increased to the first height.

An example method includes determining whether a tire of a vehicle is underinflated, after determining that the tire is underinflated, causing air to be delivered to an air compartment coupled to a vehicle body to increase a height of the vehicle body to a first height, and after the height of the vehicle body is increased to the first height, preventing the air from moving into or out of the air compartment.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Dealing with an underinflated (e.g., flat) tire is a stressful and labor intensive situation for a user. For instance, the user has to get out of their vehicle, jack their vehicle to lift the underinflated tire off the ground, remove the underinflated tire, retrieve a spare tire, install the spare tire, and stow the underinflated tire. The difficulties are amplified in abnormal weather and/or driving terrain.

Additionally, when a vehicle includes an air suspension system, components thereof may be affected by jacking the vehicle body while the air suspension system attempts to maintain a target ground clearance height (e.g., ride height). More particularly, as the vehicle is lifted or raised near the underinflated tire, air may be released from an air compartment mounting the portion of the vehicle. As a result, the air compartment empties before a ground clearance height increase is achieved that lifts the portion of the vehicle off the ground. Additionally, as the air compartment empties, the air compartment can be left without a sufficient amount of air to separate components that are not designed for contact.

Figure 1:
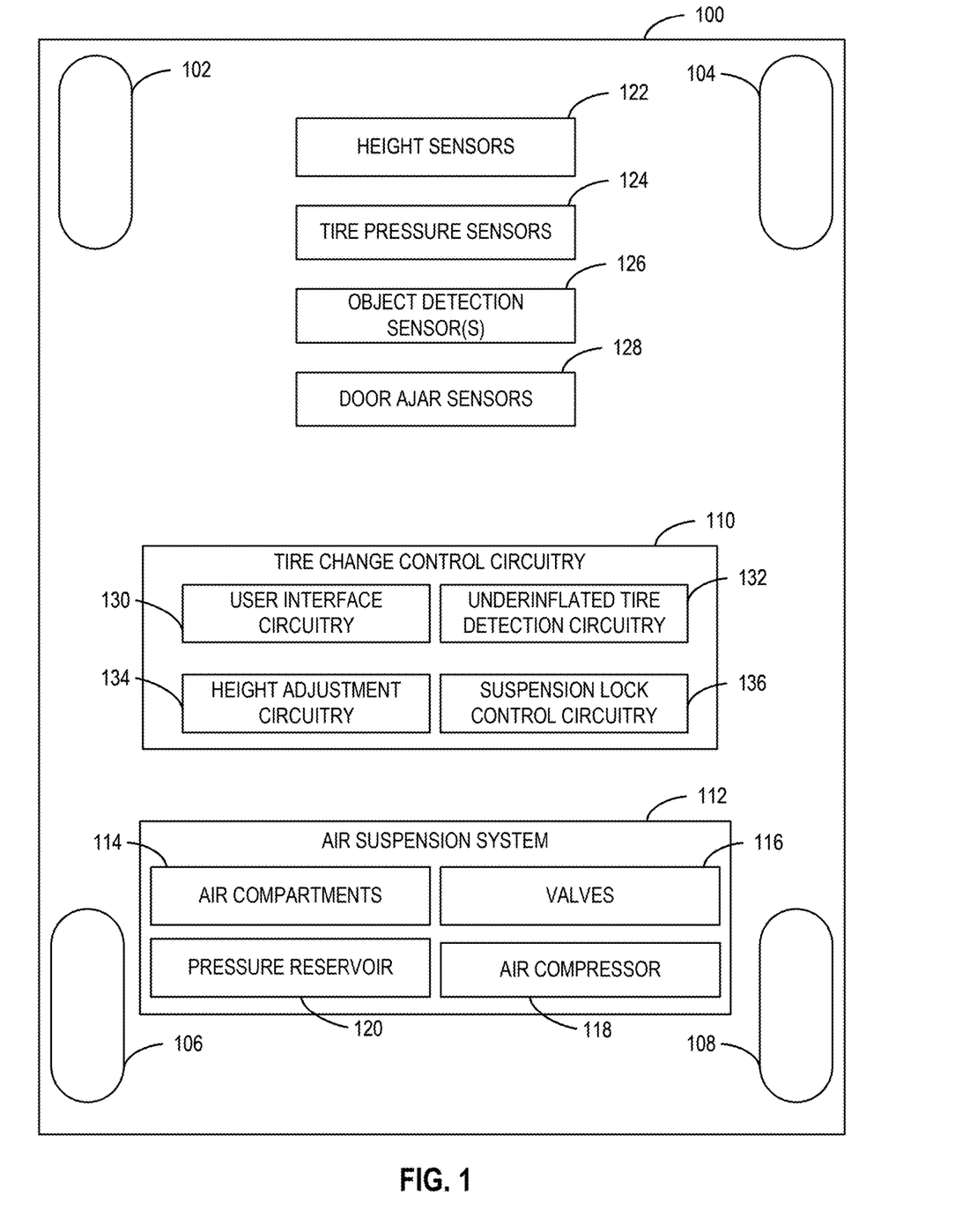
FIG. 1 is a block diagram of an example vehicle in which example tire change control circuitry operates to facilitate a replacement of a tire of the vehicle.

Examples disclosed herein facilitate a tire change. Additionally, examples disclosed herein prevent an air suspension system from being affected during the tire change. Turning to the figures, FIG. 1 is a block diagram of an example vehicle 100 including a first tire 102 (e.g., a first wheel, a front-left tire/wheel), a second tire 104 (e.g., a second wheel, a front-right tire/wheel), a third tire 106 (e.g., a third wheel, a rear-left tire/wheel), a fourth tire 108 (e.g., a fourth wheel, a rear-right tire/wheel), and example tire change control circuitry 110 to facilitate a replacement of one of the tires 102, 104, 106, 108. Although the vehicle 100 of FIG. 1 includes four tires, it should be understood that examples disclosed herein can be implemented in a vehicle with any number of tires.

In the illustrated example of FIG. 1, the vehicle 100 includes an air suspension system 112 including air compartments 114 (e.g., airbags, air springs, etc.), valves 116, an air compressor 118, and a pressure reservoir 120. The air compartments 114 are positioned between a body (e.g., a frame, a chassis) of the vehicle 100 and another vehicle component, such as an axle or control arm, to support a weight of the vehicle 100 and enable adjustments to a ground clearance height (e.g., a ride height) of the vehicle 100. Specifically, the valves 116, the air compressor 118, and the pressure reservoir 120 can move air into the air compartments 114 to increase the ground clearance height or move air out of the air compartments 114 to reduce the ground clearance height. In some examples, the air compartments 114 include two compartments coupled to a front axle and a rear axle, respectively. In some examples, the air compartments 114 include four compartments associated with respective corners of the vehicle 100.

In the illustrated example of FIG. 1, the vehicle 100 includes height sensors 122 to detect a distance between the body of the vehicle 100 and a surface on which the vehicle 100 is located (e.g., a driving surface, a ground surface). The height sensors 122 can be coupled to the body of the vehicle 100 at or near the tires 102, 104, 106, 108 and/or the axles of the vehicle 100. The height sensors 122 can detect a distance between (i) a mounting location to which the air compartments 114 couple to raise and lower the body of the vehicle 100 and (ii) a point on the surface beneath the vehicle 100. In some examples, the height sensors 122 are implemented by a potentiometer, a Hall effect sensor, an optical sensor, an ultrasonic sensor, or any other sensor capable of measuring the distance between the body of the vehicle 100 and the surface below the vehicle 100.

In the illustrated example of FIG. 1, the vehicle 100 includes tire pressure sensors 124 operatively coupled to the tires 102, 104, 106, 108. For example, the respective tire pressure sensors 124 can be positioned in the respective tires 102, 104, 106, 108 (e.g., mounted on a valve stem or an inner side of a rim) to measure respective tire pressures of the tires 102, 104, 106, 108. In some other examples, the tire pressure sensors 124 indirectly monitor the tire pressures. For example, the tire pressure sensors 124 can measure another parameter, such as wheel speed, that enables a relative pressure difference between the tires 102, 104, 106, 108 to be determined.

In the illustrated example of FIG. 1, the vehicle 100 also includes one or more object detection sensors 126 (e.g., an optical sensor(s), a camera(s)) and door ajar sensors 128. The object detection sensor(s) 126 can be operatively coupled to an underbody of the vehicle 100 to detect objects under the vehicle 100, such as a car jack being used to raise a portion (e.g., a corner) of the vehicle 100 for a tire change. The door ajar sensors 128 are coupled to respective doors of the vehicle 100 to detect whether the door is in an open position. For example, the door ajar sensors 128 can be implemented by a switch, a Hall effect sensor, or any other sensor capable of detecting a presence of the door relative to a latch to which the door couples when closed.

The tire change control circuitry 110 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the tire change control circuitry 110 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

The tire change control circuitry 110 is communicatively coupled to the air suspension system 112. For example, the tire change control circuitry 110 can be communicatively coupled to the valves 116 and/or the air compressor 118 to control movement of air to and from the air compartments 114. Additionally, the tire change control circuitry 110 is communicatively coupled to the height sensors 122, the tire pressure sensors 124, the object detection sensor(s) 126, and the door ajar sensors 128.

In some examples, the tire change control circuitry 110 is an internal component of the vehicle 100. For example, the tire change control circuitry 110 can be implemented by a portion of an electronic control unit of the vehicle 100. In some examples, at least a portion of the tire change control circuitry 110 is implemented by a device that is external to and/or separable from the vehicle 100 and from/to which the air suspension system 112, the height sensors 122, the tire pressure sensors 124, the object detection sensor(s) 126, and/or the door ajar sensors 128 can receive and/or transmit information. For example, the tire change control circuitry 110 can be implemented by an application on a user device, such as a smartphone and/or a tablet of a user associated with the vehicle 100.

The tire change control circuitry 110 includes user interface circuitry 130 to facilitate communication with the user of the vehicle 100. For example, the user interface circuitry 130 can include and/or be communicatively coupled to a display with which the user can interact (e.g., a touchscreen), a speaker, a microphone, and/or any other component to enable communication between the user and the tire change control circuitry 110. In some examples, the user interface circuitry 130 prompts the user to select a particular operating mode according to which the vehicle 100 is to operate. For example, the user can activate and/or deactivate a tire change mode via the user interface circuitry 130 when the user plans to change at least one of the tires 102, 104, 106, 108 and/or has completed changing at least one of the tires 102, 104, 106, 108. In some examples, when the tire change mode is triggered, the user interface circuitry 130 renders instructions to the user on how to change the tire. Other operating modes can include an off-road mode and/or a service mode. In some examples, the user interface circuitry 130 is instantiated by programmable circuitry executing user interface instructions and/or configured to perform operations such as those represented by the flowchart of FIG. 3.

The tire change control circuitry 110 includes underinflated tire detection circuitry 132 to detect when at least one of the tires 102, 104, 106, 108 is underinflated (e.g., flat). For example, the underinflated tire detection circuitry 132 can analyze a first tire pressure of the first tire 102, a second tire pressure of the second tire 104, a third tire pressure of the third tire 106, and/or a fourth tire pressure of the fourth tire 108 measured by the tire pressure sensors 124. The underinflated tire detection circuitry 132 can determine whether at least one of the tires 102, 104, 106, 108 is underinflated based on the tire pressures. For example, the underinflated tire detection circuitry 132 can determine that the first tire 102 is underinflated in response to the first tire pressure being less than an average between the second tire pressure, the third tire pressure, and the fourth tire pressure by at least a threshold percentage of the average. In some examples, the threshold percentage is greater than or equal to 15%. In some examples, the underinflated tire detection circuitry 132 determines that a tire is underinflated in response to the tire having a tire pressure that is at least the threshold percentage less than an average of the three highest tire pressures associated with the vehicle 100. That is, when a vehicle includes more than four tires, the underinflated tire detection circuitry 132 can utilize the average of the three highest tire pressures to determine whether another tire is underinflated to avoid unnecessary computation and detect the underinflated tire quicker. In some examples, the underinflated tire detection circuitry 132 determines that one of the tires 102, 104, 106, 108 is underinflated in response to the associated tire pressure not satisfying a pressure threshold. In some examples, the underinflated tire detection circuitry 132 detects an underinflated tire in response to detecting (i) an object (e.g., a car jack) under the vehicle 100 while the vehicle 100 is stationary via the object detection sensor(s)

126 (e.g., object detection sensors) and (ii) an increase in a ground clearance height of the vehicle 100 via the height sensors 122.

The tire change control circuitry 110 includes height adjustment circuitry 134 to increase the ground clearance height of the vehicle 100 in response to a determination that at least one of the tires 102, 104, 106, 108 is underinflated. That is, the height adjustment circuitry 134 can cause the air suspension system 112 to increase the ground clearance height of the vehicle 100 to a first height. For example, the height adjustment circuitry 134 can control the valves 116 and/or the air compressor 118 to cause air to be delivered to the air compartments 114 to increase the height of the body of the vehicle 100 positioned on the air compartments 114 to the first height. In some examples, the first height is approximately a maximum ground clearance height associated with the vehicle 100. As used herein, "approximately" a maximum ground clearance height associated with the vehicle 100 encompasses a maximum ground clearance height associated with the vehicle 100 (e.g., a maximum ground clearance height that the vehicle 100 can achieve with the air suspension system 112) and more broadly encompasses a height within 15% of the maximum ground clearance height of the vehicle 100.

In some examples, the height adjustment circuitry 134 pauses increasing the ground clearance height (e.g., pauses moving air into the air compartments 114) in response to the door ajar sensors 128 indicating that at least one door of the vehicle 100 is in an open position (e.g., ajar). As such, the height adjustment circuitry 134 can pause the ground clearance height increase for user egress and/or ingress.

As a result of increasing the ground clearance height to approximately the maximum height associated with the vehicle 100, the tire change control circuitry 110 reduces a distance that the user is to raise the body of the vehicle 100 (e.g., via the car jack) to lift the underinflated tire (e.g., the first tire 102) off of the surface on which the tires 102, 104, 106, 108 are positioned. Thus, the increase in the ground clearance height minimizes or otherwise reduces work to be performed by the user to change the underinflated tire. The height increase and work performed by the user may be further reduced by a block on top of which the car jack is positioned to close the distance between the car jack and the body of the vehicle 100. In some examples, the height adjustment circuitry 134 is instantiated by programmable circuitry executing height adjustment instructions and/or configured to perform operations such as those represented by the flowchart of FIG. 3.

The tire change control circuitry 110 includes suspension lock control circuitry 136 to cause the air suspension system 112 to prevent air movement to and from the air compartments 114 in response to the ground clearance height of the vehicle being increased to the first height. As a result, the suspension lock control circuitry 136 prevents the air suspension system 112 from being affected when the air suspension system 112 attempts to maintain a certain ground clearance height and/or keep the vehicle level when the user is raising a portion of the body of the vehicle 100 to replace the underinflated tire.

Moreover, as the underinflated tire detection circuitry 132 detects that the user is changing the underinflated tire in response to detecting (i) the object (e.g., the car jack) under the vehicle 100 while the vehicle 100 is stationary and (ii) the increase in the ground clearance height of the vehicle 100, the suspension lock control circuitry 136 can prevent the air suspension system 112 from being affected in substantially real time. In some examples, in response to detecting (i) the object (e.g., the car jack) under the vehicle 100 while the vehicle 100 is stationary and (ii) the increase in the ground clearance height of the vehicle 100, the suspension lock control circuitry 136 prevents movement of air out of the air compartments 114 while enabling movement of air into the air compartments 114 such that the height adjustment circuitry 134 can still cause the ground clearance height to be raised to lessen the work required by the user to change the tire while preventing the air suspension system 112 from being affected. In some other examples, in response to detecting (i) the object (e.g., the car jack) under the vehicle 100 while the vehicle 100 is stationary and (ii) the increase in the ground clearance height of the vehicle 100, the suspension lock control circuitry 136 prevents movement of air into or out of the air compartments 114 to avoid ground clearance height adjustments while the vehicle is being jacked and to ensure protection of the air suspension system 112.

In some examples, the underinflated tire detection circuitry 132 determines that a tire change is complete (e.g., that the underinflated tire has been replaced by a spare tire) based on an input the user interface circuitry 130 receives (e.g., when the user exits the tire change mode via the user interface circuitry 130). In some examples, the underinflated tire detection circuitry 132 determines that a tire change is complete based on information from the height sensors 122 and/or the object detection sensor(s) 126. For example, the underinflated tire detection circuitry 132 can determine that the tire change is complete when information from the object detection sensor(s) 126 is indicative of the car jack being removed from under the vehicle 100. In some examples, the underinflated tire detection circuitry 132 determines that the tire change is complete in response to information from the height sensors 122 being indicative of a corner of the body of the vehicle 100 being raised higher than approximately the maximum height of the vehicle 100 and subsequently lowered to approximately the maximum height of the vehicle 100. In some examples, the underinflated tire detection circuitry 132 determines that the tire change has been completed in response to respective wheel speeds of the tires 102, 104, 106, 108 indicating that the relative pressure difference between the tires 102, 104, 106, 108 is within a threshold range.

After the underinflated tire has been replaced, the underinflated tire detection circuitry 132 prevents a subsequent determination that the spare tire that was placed in the location of the underinflated tire is underinflated (e.g., flat). Specifically, the underinflated tire detection circuitry 132 will continue to read the low tire pressure from the respective tire pressure sensor 124 associated with the underinflated tire that was replaced. To prevent false positive underinflated tire alerts and annoyance to the user, the underinflated tire detection circuitry 132 ignores the low tire pressure and monitors for a replacement tire to be installed with another tire pressure sensor 124 that communicatively couples to the tire change control circuitry 110. For example, after the first tire 102 has been replaced, the underinflated tire detection circuitry 132 prevents a subsequent determination that a front-left tire of the vehicle 100 is underinflated before determining that a pressure of the front-left tire is within a range (e.g., within 3 pounds per square inch (PSI), within 5%, etc.) of the average pressure associated with a remainder of the plurality of tires (e.g., the second tire 104, the third tire 106, and the fourth tire 108). In some examples, the underinflated tire detection circuitry 132 is instantiated by programmable circuitry executing underinflated tire detection instructions and/or configured to perform operations such as those represented by the flowchart of FIG. 3.

Further, when the tire change is complete, the suspension lock control circuitry 136 can enable the valves 116 and/or the air compressor 118 to adjust an amount of air in the air compartments 114. As such, the suspension lock control circuitry 136 can enable the valves 116 and/or the air compressor 118 to move air out of the air compartments 114 to reduce the ground clearance height (e.g., to a height at which the vehicle 100 is to be driven). In some examples, the suspension lock control circuitry 136 is instantiated by programmable circuitry executing suspension lock control instructions and/or configured to perform operations such as those represented by the flowchart of FIG. 3.

Figure 2:
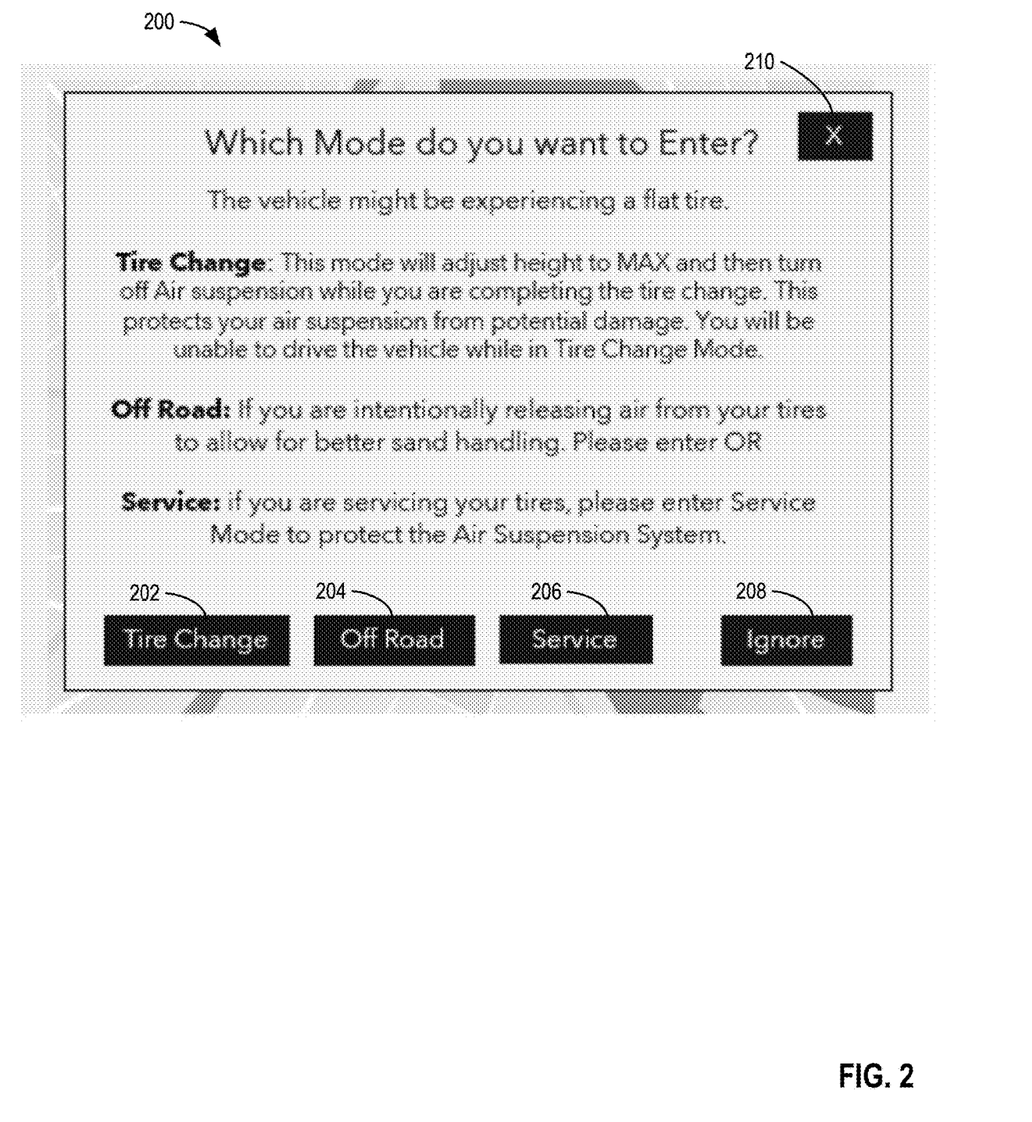
FIG. 2 illustrates an example prompt deliverable to a user of the vehicle by the tire change control circuitry of FIG. 1.

FIG. 2 illustrates an example prompt 200 deliverable to a user of the vehicle by the tire change control circuitry 110. For example, the underinflated tire detection circuitry 132 can cause the user interface circuitry 130 to render the prompt 200 in response to detecting an underinflated tire. The prompt 200 includes a tire change option 202, an off road option 204, a service option 206, an ignore option 208, and an exit option 210. Accordingly, when the user interface circuitry 130 determines that the tire change option 202 has been selected, the tire change control circuitry 110 causes the vehicle 100 to enter the tire change mode, as discussed above. Alternatively, when the user interface circuitry 130 determines that the off road option 204, the service option 206, the ignore option 208, or the exit option 210 has been selected, the tire change control circuitry 110 refrains from entering the tire change mode. The underinflated tire detection circuitry 132 can cause the user interface circuitry 130 to render another prompt to the user that does not include the off road option 204 when an underinflated tire is detected while the vehicle 100 is operating in the off road mode.

While an example manner of implementing the tire change control circuitry 110 of FIG. 1 is illustrated in FIG. 1, one or more of the elements, processes, and/or devices illustrated in FIG. 1 may be combined, divided, re-arranged, omitted, eliminated, and/or implemented in any other way. Further, the example user interface circuitry 130, the example underinflated tire detection circuitry 132, the example height adjustment circuitry 134, the example suspension lock control circuitry 136, and/or, more generally, the example tire change control circuitry 110 of FIG. 1, may be implemented by hardware alone or by hardware in combination with software and/or firmware. Thus, for example, any of the example user interface circuitry 130, the example underinflated tire detection circuitry 132, the example height adjustment circuitry 134, the example suspension lock control circuitry 136, and/or, more generally, the example tire change control circuitry 110, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example tire change control circuitry 110 of FIG. 1 may include one or more elements, processes, and/or devices in addition to, or instead of, those illustrated in FIG. 1, and/or may include more than one of any or all of the illustrated elements, processes and devices.

Figure 3:
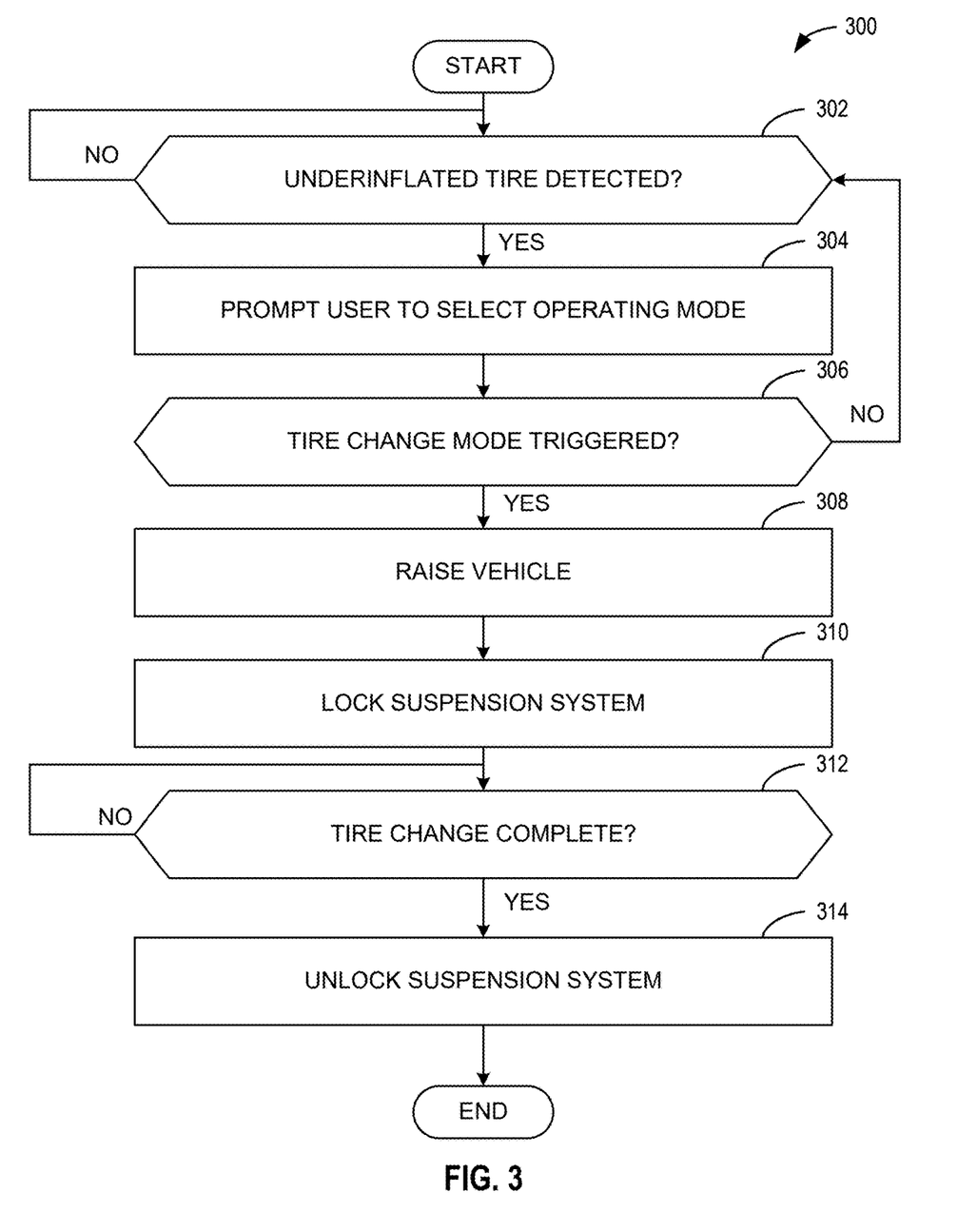
FIG. 3 is a flowchart representative of example machine readable instructions and/or example operations that may be executed, instantiated, and/or performed by example programmable circuitry to implement the tire change control circuitry of FIG. 1.

A flowchart representative of example machine readable instructions, which may be executed by programmable circuitry to implement and/or instantiate the tire change control circuitry 110 of FIG. 1 and/or representative of example operations which may be performed by programmable circuitry to implement and/or instantiate the tire change control circuitry 110 of FIG. 1, are shown in FIG. 3. The machine readable instructions may be one or more executable programs or portion(s) of one or more executable programs for execution by programmable circuitry such as the programmable circuitry 412 shown in the example processor platform 400 discussed below in connection with FIG. 4. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 3, many other methods of implementing the example tire change control circuitry 110 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 3 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 3 is a flowchart representative of example machine readable instructions and/or example operations 300 that may be executed, instantiated, and/or performed by programmable circuitry to facilitate a tire change that protects the air suspension system 112 and reduces labor to be performed by the user. The example machine-readable instructions and/or the example operations 300 of FIG. 3 begin at block 302, at which the tire change control circuitry 110 determines whether an underinflated (e.g., flat) tire is detected. For example, the tire pressure sensors 124 can measure a first tire pressure of the first tire 102, a second tire pressure of the second tire 104, a third tire pressure of the third tire 106, and/or a fourth tire pressure of the fourth tire 108. Further, the underinflated tire detection circuitry 132 can determine whether at least one of the tires 102, 104, 106, 108 is underinflated based on the tire pressures. In some examples, the underinflated tire detection circuitry 132 determines that a tire is underinflated in response to the tire having a tire pressure that is at least a threshold percentage less than an average of the three highest tire pressures associated with the vehicle 100. For example, the underinflated tire detection circuitry 132 can determine that the first tire 102 is underinflated in response to the first tire pressure being at least a threshold percentage less than an average between the second tire pressure, the third tire pressure, and the fourth tire pressure. In some examples, the threshold percentage is greater than or equal to 15%. In some examples, the underinflated tire detection circuitry 132 determine that one of the tires 102, 104, 106, 108 is underinflated in response to the associated tire pressure not satisfying a pressure threshold. In some examples, the underinflated tire detection circuitry 132 detects an underinflated tire in response to detecting while the vehicle 100 is stationary (i) an object (e.g., a car jack) under the vehicle 100 via the object detection sensor(s) 126 and (ii) an increase in a ground clearance height of the vehicle 100 via the height sensors 122. When an underinflated tire is detected, the operations 300 proceed to block 304. Otherwise, when an underinflated tire is not detected, the operations 300 repeat block 302.

At block 304, the tire change control circuitry 110 prompts the user to select an operating mode. For example, the user interface circuitry 130 can provide a request to enter a tire change mode to the user in response to detecting the underinflated tire. In some examples, the user interface circuitry 130 enables the user to navigate to a mode selection screen, such as the example display screen of FIG. 2.

At block 306, the tire change control circuitry 110 determines whether the tire change mode is triggered. In some examples, the user interface circuitry 130 triggers the tire change mode in response to the user selecting the tire change mode and/or accepting the request to enter the tire change mode. In some examples, the underinflated tire detection circuitry 132 triggers the tire change mode in response to detecting (i) the object (e.g., the car jack) under the vehicle 100 and (ii) the increase in the ground clearance height of the vehicle 100. In some examples, the underinflated tire detection circuitry 132 triggers the tire change mode after (i) the underinflated tire is detected, (ii) the vehicle 100 is parked, and (iii) a door of the vehicle 100 is opened. For example, the underinflated tire detection circuitry 132 can identify when a door of the vehicle is opened via the door ajar sensors 128. In some examples, when the tire change mode is triggered, the user interface circuitry 130 renders instructions to the user on how to change the tire. When the tire change mode is triggered, the operations 300 proceed to block 308. Otherwise, when the tire change mode is not triggered, the operations 300 return to block 302.

At block 308, the tire change control circuitry 110 raises the vehicle 100. The height adjustment circuitry 134 can cause the air suspension system 112 to increase the ground clearance height of the vehicle 100 to approximately a maximum height associated with the vehicle 100. For example, the height adjustment circuitry 134 can control the valves 116 and the air compressor 118 to cause air to be delivered to the air compartments 114 to increase the height of a body of the vehicle 100 positioned on the air compartments 114. In some examples, the height adjustment circuitry 134 pauses increasing the ground clearance height (e.g., pauses air movement into the air compartments 114) in response to the door ajar sensors 128 indicating that at least one door of the vehicle 100 is in an open position (e.g., ajar). As such, the height adjustment circuitry 134 can pause the ground clearance height increase for user egress and/or ingress. As a result of increasing the ground clearance height to approximately the maximum height associated with the vehicle 100, the tire change control circuitry 110 reduces a distance that the user raises the vehicle body (e.g., via the car jack) to lift the underinflated tire (e.g., the first tire 102) off the surface on which the tires 102, 104, 106, 108 are positioned. Thus, the increase in the ground clearance height minimizes or otherwise reduces work to be performed by the user to change the underinflated tire.

At block 310, the tire change control circuitry 110 locks the air suspension system 112. For example, the suspension lock control circuitry 136 can prevent air from moving into or out of the air compartments 114 after the ground clearance height is increased to approximately the maximum height associated with the vehicle 100. As a result, the suspension lock control circuitry 136 prevents the air suspension system 112 from being affected when the air suspension system 112 attempts to maintain a certain ground clearance height and/or keep the vehicle level when the user is raising a portion of the vehicle body to replace the underinflated tire.

At block 312, the tire change control circuitry 110 determines whether the tire change is complete. For example, the user interface circuitry 130 can identify that the tire change is complete in response to the user exiting the tire change mode. In some examples, the user interface circuitry 130 prompts the user to confirm that there is not an object (e.g., the car jack) under the vehicle 100 after the user exits the tire change mode. In some examples, the underinflated tire detection circuitry 132 determines whether the tire change is complete based on information from the height sensors 122 and/or the object detection sensor(s) 126. When the tire change is complete, the operations 300 proceed to block 314. Otherwise, when the tire change is not yet complete, the operations 300 repeat block 312.

At block 314, the tire change control circuitry 110 unlocks the air suspension system 112. For example, the suspension lock control circuitry 136 can enable the valves 116 and/or the air compressor 118 to adjust an amount of air in the air compartments 114. As such, the suspension lock control circuitry 136 can cause the valves 116 and/or the air compressor 118 to move air out of the air compartments 114 to reduce the ground clearance height (e.g., to a height at which the vehicle 100 is to be driven).

In some examples, after the underinflated tire has been replaced, the underinflated tire detection circuitry 132 prevents a subsequent determination that the spare tire that was placed in the location of the underinflated tire is underinflated (e.g., flat). Specifically, the underinflated tire detection circuitry 132 will continue to read the low tire pressure from the respective tire pressure sensor 124 associated with (e.g., embedded in) the underinflated tire that was replaced. To prevent annoyance to the user, the underinflated tire detection circuitry 132 ignores or does not cause the user interface circuitry 130 to provide an underinflated tire alert for the low tire pressure and/or a request to enter the tire change mode. Instead, the underinflated tire detection circuitry 132 monitors for a replacement tire to be installed with another tire pressure sensor 124 that communicatively couples to the tire change control circuitry 110. For example, after the first tire 102 has been replaced, the underinflated tire detection circuitry 132 prevents a subsequent determination that a front-left tire of the vehicle 100 is underinflated before determining that a pressure of the front-left tire is within a range (e.g., within 3 PSI, within 5%, etc.) of the average pressure associated with a remainder of the plurality of tires (e.g., the second tire 104, the third tire 106, and the fourth tire 108).

Figure 4:
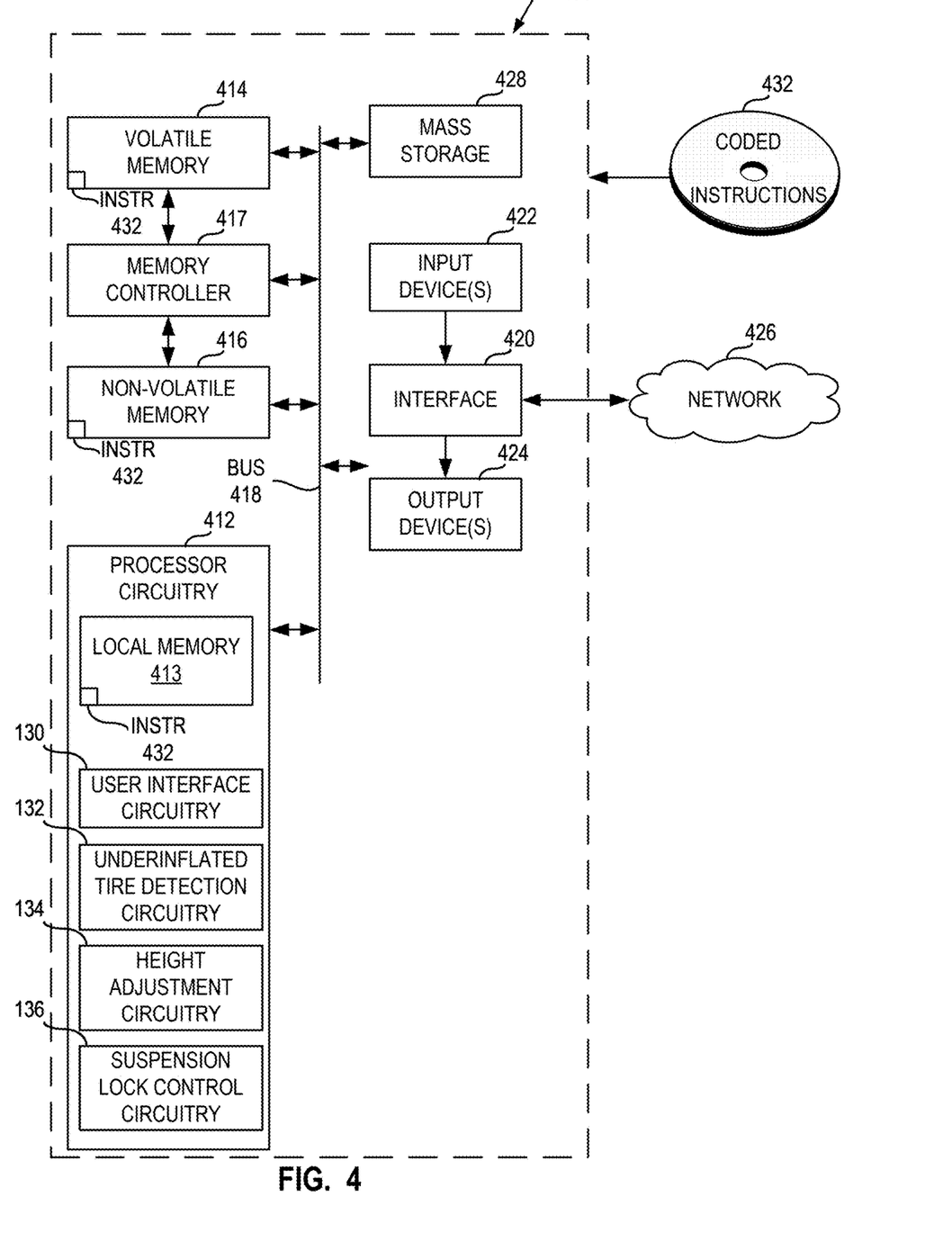
FIG. 4 is a block diagram of an example processing platform including programmable circuitry structured to execute, instantiate, and/or perform the example machine readable instructions and/or perform the example operations of FIG. 3 to implement the tire change control circuitry of FIG. 1.

FIG. 4 is a block diagram of an example programmable circuitry platform 400 structured to execute and/or instantiate the example machine-readable instructions and/or the example operations of FIG. 3 to implement the tire change control circuitry 110 of FIG. 1. The programmable circuitry platform 400 can be, for example, a mobile device (e.g., a cell phone, a smart phone, a tablet such as an iPad™), an Internet appliance, or any other type of computing and/or electronic device.

The programmable circuitry platform 400 of the illustrated example includes programmable circuitry 412. The programmable circuitry 412 of the illustrated example is hardware. For example, the programmable circuitry 412 can be implemented by one or more integrated circuits, logic circuits, FPGAs, microprocessors, CPUs, GPUs, DSPs, and/or microcontrollers from any desired family or manufacturer. The programmable circuitry 412 may be implemented by one or more semiconductor based (e.g., silicon based) devices. In this example, the programmable circuitry 412 implements the example user interface circuitry 130, the example underinflated tire detection circuitry 132, the example height adjustment circuitry 134, and the example suspension lock control circuitry 136.

The programmable circuitry 412 of the illustrated example includes a local memory 413 (e.g., a cache, registers, etc.). The programmable circuitry 412 of the illustrated example is in communication with main memory 414, 416, which includes a volatile memory 414 and a non-volatile memory 416, by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417. In some examples, the memory controller 417 may be implemented by one or more integrated circuits, logic circuits, microcontrollers from any desired family or manufacturer, or any other type of circuitry to manage the flow of data going to and from the main memory 414, 416.

The programmable circuitry platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user (e.g., a human user, a machine user, etc.) to enter data and/or commands into the programmable circuitry 412. The input device(s) 422 can be implemented by, for example, an audio sensor, a microphone, a camera (still or video), a keyboard, a button, a touchscreen, a trackpad, a trackball, an isopoint device, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, and/or a speaker. In some examples, the input device(s) 422 and/or the output device(s) 424 implement at least a portion of the user interface circuitry 130. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 400 of the illustrated example also includes one or more mass storage discs or devices 428 to store firmware, software, and/or data. Examples of such mass storage discs or devices 428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 432, which may be implemented by the machine readable instructions of FIG. 3, may be stored in the mass storage device 428, in the volatile memory 414, in the non-volatile memory 416, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a vehicle body) is in any way on (e.g., positioned on, located on, disposed on, or formed on, etc.) another part (e.g., a suspension air compartment), indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that facilitate a tire change.

Example methods, apparatus, systems, and articles of manufacture to facilitate a tire change are disclosed herein. Further examples and combinations thereof include the following:

Example 1 includes an apparatus comprising interface circuitry, machine readable instructions, and programmable circuitry to at least one of instantiate or execute the machine readable instructions to detect an underinflated tire of a vehicle, cause an air suspension system to increase a ground clearance height of the vehicle to a first height in response to detecting the underinflated tire, and cause the air suspension system to prevent air movement after the ground clearance height is increased to the first height.

Example 2 includes the apparatus of example 1, wherein the first height is approximately a maximum ground clearance height associated with the vehicle.

Example 3 includes the apparatus of example 1, wherein the underinflated tire is a first tire, wherein the vehicle includes a second tire, a third tire, and a fourth tire, and wherein the programmable circuitry is to at least one of instantiate or execute the machine readable instructions to detect the underinflated tire in response to a pressure of the first tire being at least a threshold percentage less than an average pressure of the second tire, the third tire, and the fourth tire.

Example 4 includes the apparatus of example 3, wherein the threshold percentage is greater than or equal to 15%.

Example 5 includes the apparatus of example 1, wherein the programmable circuitry is to detect the underinflated tire in response to the underinflated tire having a pressure that does not satisfy a pressure threshold.

Example 6 includes the apparatus of example 1, wherein the programmable circuitry is to at least one of instantiate or execute the machine readable instructions to cause the air suspension system to pause increasing the ground clearance height when a door of the vehicle is in an open position.

Example 7 includes the apparatus of example 1, wherein the programmable circuitry is to at least one of instantiate or execute the machine readable instructions to detect the underinflated tire in response to (i) detecting an object under the vehicle while stationary and (ii) an increase in the ground clearance height of the vehicle.

Example 8 includes a vehicle comprising a suspension system including an air compartment coupled to a body of the vehicle to control a height of the body, a tire, interface circuitry, machine readable instructions, and programmable circuitry to at least one of instantiate or execute the machine readable instructions to determine whether the tire is underinflated, cause air to be delivered to the air compartment to increase the height of the body to a first height after determining that the tire is underinflated, and prevent the air from moving into or out of the air compartment after the height of the body is increased to the first height.

Example 9 includes the vehicle of example 8, further including a sensor to measure a pressure of the tire, and wherein the programmable circuitry is to at least one of instantiate or execute the machine readable instructions to determine whether the tire is underinflated based on the pressure.

Example 10 includes the vehicle of example 9, wherein the tire is a first tire of a plurality of tires, and wherein the programmable circuitry is to at least one of instantiate or execute the machine readable instructions to determine that the tire is underinflated when the pressure of the first tire is less than an average pressure for a remainder of the plurality of tires by at least a threshold.

Example 11 includes the vehicle of example 10, wherein the threshold is greater than or equal to 15% of the average pressure of the remainder of the plurality of tires.

Example 12 includes the vehicle of example 10, wherein the pressure is a first pressure, wherein the first tire is associated with a first location, and wherein, in response to receiving an indication that the tire has been replaced, the programmable circuitry is to at least one of instantiate or execute the machine readable instructions to enable air movement out of the air compartment, and prevent a subsequent determination that a second tire placed in the first location is underinflated before determining that a second pressure associated with the second tire is within a range of the average pressure associated with the remainder of the plurality of tires.

Example 13 includes the vehicle of example 9, wherein the programmable circuitry is to at least one of instantiate or execute the machine readable instructions to cause the suspension system to pause moving air into the air compartment to increase the height of the body when a door of the vehicle is in an open position.

Example 14 includes the vehicle of example 9, wherein the programmable circuitry is to at least one of instantiate or execute the machine readable instructions to determine that the tire is underinflated in response to (i) detecting an object under the vehicle while stationary and (ii) an increase in the height of the body.

Example 15 includes the vehicle of example 9, wherein the first height is approximately a maximum height associated with the body of the vehicle.

Example 16 includes a method comprising determining whether a tire of a vehicle is underinflated, after determining that the tire is underinflated, causing air to be delivered to an air compartment coupled to a vehicle body to increase a height of the vehicle body to a first height, and after the height of the vehicle body is increased to the first height, preventing the air from moving into or out of the air compartment.

Example 17 includes the method of example 16, wherein determining whether the tire of the vehicle is underinflated includes comparing a first pressure of the tire to a second pressure associated with one or more other tires of the vehicle, and determining that the tire is underinflated when the first pressure is less than the second pressure by at least 15% of the second pressure.

Example 18 includes the method of example 16, wherein the first height is approximately a maximum height associated with the vehicle body.

Example 19 includes the method of example 16, wherein the tire is a first tire of a plurality of tires, wherein the first tire is associated with a first location, and further including identifying that the first tire has been replaced, enabling air movement out of the air compartment, and preventing a subsequent determination that a second tire in the first location is underinflated before determining that a pressure of the second tire is within a range of an average pressure associated with a remainder of the plurality of tires.

Example 20 includes the method of example 16, further including detecting an object under the vehicle while the vehicle is stationary, detecting an increase in the height of the vehicle, and determining that the tire is underinflated after (i) detecting the object under the vehicle while the vehicle is stationary and (ii) detecting the increase in the height of the vehicle.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   interface circuitry;
   machine readable instructions; and
   programmable circuitry to at least one of instantiate or execute the machine readable instructions to:
   determine an average pressure of at least two of a plurality of tires of a vehicle;
   detect an underinflated tire of the vehicle in response to a pressure of the underinflated tire being at least a threshold percentage less than the average pressure;
   cause an air suspension system to increase a ground clearance height of the vehicle to a first height in response to detecting the underinflated tire; and
   cause the air suspension system to prevent air movement after the ground clearance height is increased to the first height.

2. The apparatus of claim 1, wherein the first height is approximately a maximum ground clearance height associated with the vehicle.

3. The apparatus of claim 1, wherein the underinflated tire is a first tire, wherein the vehicle includes a second tire, a third tire, and a fourth tire, and wherein the programmable circuitry is to at least one of instantiate or execute the machine readable instructions to determine the average pressure of the at least two of the plurality of tires as an average pressure of the second tire, the third tire, and the fourth tire.

4. The apparatus of claim 1, wherein the threshold percentage is greater than or equal to 15%.

5. The apparatus of claim 1, wherein the programmable circuitry is to detect the underinflated tire in response to the pressure of the underinflated tire not satisfying a pressure threshold.

6. The apparatus of claim 1, wherein the programmable circuitry is to at least one of instantiate or execute the machine readable instructions to cause the air suspension system to pause increasing the ground clearance height when a door of the vehicle is in an open position.

7. The apparatus of claim 1, wherein the programmable circuitry is to at least one of instantiate or execute the machine readable instructions to detect the underinflated tire in response to (i) detecting an object under the vehicle while stationary and (ii) an increase in the ground clearance height of the vehicle.

8. A vehicle comprising:
a suspension system including an air compartment coupled to a body of the vehicle to control a height of the body;
a plurality of tires;
interface circuitry;
machine readable instructions; and
programmable circuitry to at least one of instantiate or execute the machine readable instructions to:
determine an average pressure of at least two of the tires of the vehicle;
determine whether a first tire of the plurality of tires is underinflated based on a comparison of a pressure of the first tire to the average pressure;
cause air to be delivered to the air compartment to increase the height of the body to a first height after determining that the first tire is underinflated; and
prevent the air from moving into or out of the air compartment after the height of the body is increased to the first height.

9. The vehicle of claim 8, further including a sensor to measure the pressure of the first tire, and wherein the programmable circuitry is to at least one of instantiate or execute the machine readable instructions to determine whether the first tire is underinflated based on the pressure.

10. The vehicle of claim 9, wherein the programmable circuitry is to at least one of instantiate or execute the machine readable instructions to determine that the first tire is underinflated when the pressure of the first tire is less than the average pressure of the at least two of the tires by at least a threshold.

11. The vehicle of claim 10, wherein the threshold is greater than or equal to 15% of the average pressure of the at least two of the tires.

12. The vehicle of claim 10, wherein the pressure of the first tire is a first pressure, wherein the first tire is associated with a first location, and wherein, in response to receiving an indication that the first tire has been replaced, the programmable circuitry is to at least one of instantiate or execute the machine readable instructions to:

enable air movement out of the air compartment; and
prevent a subsequent determination that a second tire placed in the first location is underinflated before determining that a second pressure associated with the second tire is within a range of the average pressure of the at least two of the tires.

13. The vehicle of claim 9, wherein the programmable circuitry is to at least one of instantiate or execute the machine readable instructions to cause the suspension system to pause moving air into the air compartment to increase the height of the body when a door of the vehicle is in an open position.

14. The vehicle of claim 9, wherein the programmable circuitry is to at least one of instantiate or execute the machine readable instructions to determine that the first tire is underinflated in response to (i) detecting an object under the vehicle while stationary and (ii) an increase in the height of the body.

15. The vehicle of claim 9, wherein the first height is approximately a maximum height associated with the body of the vehicle.

16. A method comprising:
determining an average pressure of at least first and second tires of a vehicle;
determining whether a third tire of the vehicle is underinflated based on a comparison of a pressure of the third tire to the average pressure;
after determining that the third tire is underinflated, causing air to be delivered to an air compartment coupled to a vehicle body to increase a height of the vehicle body to a first height; and
after the height of the vehicle body is increased to the first height, preventing the air from moving into or out of the air compartment.

17. The method of claim 16, wherein determining whether the third tire of the vehicle is underinflated includes:
comparing the pressure of the third tire to the average pressure of the at least first and second tires of the vehicle; and
determining that the third tire is underinflated when the pressure is less than the average pressure by at least 15% of the average pressure.

18. The method of claim 16, wherein the first height is approximately a maximum height associated with the vehicle body.

19. The method of claim 16, wherein the third tire is associated with a first location, and further including:
identifying that the third tire has been replaced;
enabling air movement out of the air compartment; and
preventing a subsequent determination that a fourth tire in the first location is underinflated before determining that a pressure of the fourth tire is within a range of the average pressure of the at least first and second tires.

20. The method of claim 16, further including:
detecting an object under the vehicle while the vehicle is stationary;
detecting an increase in the height of the vehicle; and
determining that the third tire is underinflated after (i) detecting the object under the vehicle while the vehicle is stationary and (ii) detecting the increase in the height of the vehicle.

* * * * *